Patented Mar. 7, 1950

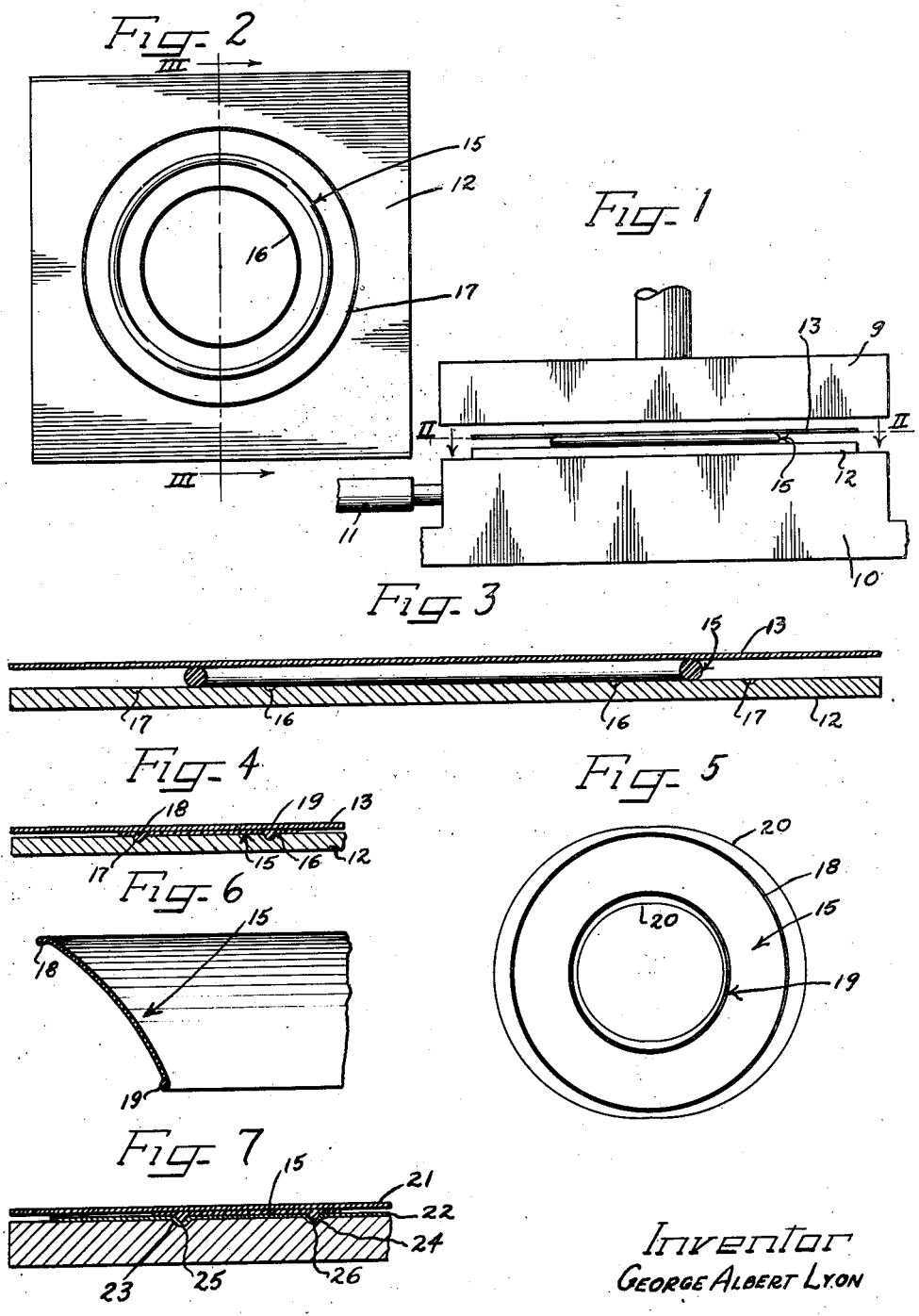

2,499,400

UNITED STATES PATENT OFFICE 2,499,400

METHOD OF MAKING PLASTIC WHEEL TRIM

George Albert Lyon, Allenhurst, N. J.

Application March 14, 1946, Serial No. 654,285

3 Claims. (Cl. 18—55)

This invention relates to a method of forming plastic and more particularly to a method of and apparatus for forming a flattened plastic ring adapted to be used as an ornamental wheel trim ring.

In the manufacture of plastic trim rings, and especially rings for use as ornamental covers on automobile wheels, it is desirable not only to provide the plastic ring with polished surfaces, but, in addition, to provide the ring with reinforced peripheral margins.

It is an object of this invention to provide a simple method of forming a flattened annular ring having reinforced peripheral margins and which ring can be readily curved transversely to provide an ultimate product having a predetermined cross-sectional curvature.

In accordance with the general features of this invention, there is provided in a method of making a plastic wheel trim of curved cross-sectional shape, the steps of pressing a ring of hot thermoplastic materials into a flattened ring and contemporaneously forming thickened beads on the inner and outer peripheral margins of the ring.

Another feature of the invention relates to the further forming of the flattened ring into one which is transversely curved between the reinforced peripheral beads thereof.

Other objects and features of this invention will more fully appear from the following detailed description taken in connection with the accompanying drawing, which illustrate several embodiments thereof, and in which Figure 1 is a somewhat diagrammatic side view of an apparatus for practicing certain steps of my process whereby a ring of plastic can be flattened and provided with reinforcing peripheral beads;

Figure 2 is a plan view of the lower plate having concentric grooves therein and showing an annular strip of plastic in position to be flattened;

Figure 3 is an enlarged fragmentary cross sectional view taken on substantially the line III—III of Figure 2 but showing the top plate also in position on the ring of plastic;

Figure 4 is a fragmentary cross-sectional view similar to Figure 3, showing portions of the plate pressed together with the plastic pressed into the concentric ribs of the lower plate;

Figure 5 is a plan view of the plastic ring after it has been flattened and showing the waste or surplus stock in the peripheral margins of the ring;

Figure 6 is a fragmentary cross-sectional view taken through a ring such as that shown in Figure 5, but showing the ring after it has been transversely curved; and Figure 7 is a fragmentary cross-sectional view similar to Figure 4 showing a modified type of lower plate and platen for use in practicing my method.

As shown on the drawings:

The reference characters 9 and 10 designate cooperable platens of a press which platens may be conventionally heated by steam or the like. I have shown the lower platen 10 as being equipped with a steam inlet pipe 11. Obviously the upper platen 9 can be similarly heated if it is so desired.

Positioned between the platens, which are movable toward and from each other by any suitable means such as hydraulic pressure, are a pair of cooperable plates 12 and 13 having highly polished confronting surfaces.

Located between the plates 12 and 13 is a strip of thermoplastic material in the form of an annulus 15. This strip may be provided by an extruder or any other suitable equipment. Its diameter is predetermined in accordance with the diameter of the ultimate flattened trim ring that is desired.

The upper plate 13 may be made of any suitable steel sheet, such, for example, as stainless steel; and similarly the lower plate 12 may be made of stainless steel or may comprise a slab of other steel having a highly polished surface.

The surface of the lower plate which is adapted to face the upper one, is provided with two concentric grooves 16 and 17 as shown in Figures 2 and 3, which perform a very useful purpose in my invention.

Now upon the heating of the platen 10 and the consequent heating of the plastic ring 15, the upper platen 9 may be moved downwardly to squash the ring 15 between the two plates 12 and 13. It should be noted in this regard that the plastic ring can be, if it is so desired, placed on the lower plate in a heated condition. In any event, the plastic should be heated to a sufficient extent to make it flowable. The temperature to which the plastic is heated will, of course, vary depending upon the type of plastic employed. I have attained excellent results by the use of thermoplastic materials, such, for example, as ethyl cellulose, cellulose acetate and vinyl resins. The flowable temperature of these plastics are all well known in the art.

From the application of pressure to the plates 12 and 13, the plastic ring 15 is flattened from the condition shown in Figure 3 to that shown in Figure 4 and inner and peripheral marginal portions of the flattened ring are pressed into the rib-like grooves 16 and 17. This results in reinforcing ribs 18 and 19 being formed on the inner and outer peripheral margins of the plastic ring. Obviously the grooves can be of any suitable cross-sectional shape so that ribs of different shapes and contours are possible.

Subsequent to the flattening of the ring it is removed from the press and is cooled. It is then in a condition similar to that diagrammatically illustrated in Figure 5. In this condition, the ring has peripheral waste and surplus portions 20—20 beyond the ribs 18 and 19. This waste can be suitably trimmed from the ring by any suitable shearing or knife-means.

After the trimming operation, the plastic ring can again be heated and placed in a suitable forming press such as that disclosed, for example, in my copending applications, Serial No. 477,003, abandoned or 599,532. In other words, the plastic ring is placed between curved bowed members so as to curve it transversely between the beads 18 and 19 to a shape, such, for example, as that shown in Figure 6.

Upon subsequent cooling of the ring, it will take a set and will then be ready for use as a useful article of manufacture, such, as in an automobile wheel trim ring.

In Figure 7 I have illustrated a modification of the invention wherein the upper plate 15 corresponds identically with that of the first form, but wherein the lower plate 22 is provided with grooved ribs 23 and 24 adapted to fit in grooves 25 and 26 in the lower platen. This structure is desirable from the standpoint that it enables the use of thinner sheet material in the lower plate, and hence the lower plate can be more economically manufactured from stainless steel and the like. With this exception the apparatus shown in Figure 7 operates in substantially the same way as that shown in Figure 4 and may be used to practice the aforesaid method of this invention.

I claim as my invention:

1. In a method of making plastic wheel trim adapted to be applied to the outer side of a vehicle wheel, the steps of depositing upon a forming surface having an annular groove therein a preformed ring of rod-like cross-section and of a ring diameter substantially different from the annular groove in said surface and to lie in concentric spaced relation to the groove, and pressing the ring in hot plastic condition into a flattened disk ring overlapping said groove and with a portion of the material of the disk ring pressed into the groove.

2. In a method of making plastic wheel trim of curved cross-sectional shape, the steps of pressing a ring of hot strip plastic into a flattened sheet-like ring, contemporaneously forming thickened beads on the inner and outer peripheral margins of said flattened ring, transversely bending the flattened plastic ring into a predetermined cross-sectional curvature between said beads, and setting the cross-sectionally curved ring with the inner and outer thickened beads offset from one another both radially and axially.

3. In a method of making a plastic wheel trim or the like, the steps of placing upon a forming surface having concentric substantially radially spaced bead-forming grooves a rod-like ring of plastic material of a diameter intermediate the diameter of said grooves and disposed concentric with said grooves, and applying heat and pressure to said plastic ring to flatten the same uniformly radially inwardly and radially outwardly into a flat sheet-like ring covering the surface intermediate said grooves and marginally overlapping said grooves at respectively the radially outer margins of the plastic flattened ring to fill inner and radially outer margins of the plastic flattened ring to fill said grooves and form marginal beads on the flattened ring.

GEORGE ALBERT LYON.

REFERENCES CITED

The following references are of record in the file of this patent:

UNITED STATES PATENTS

| Number | Name | Date |
| --- | --- | --- |
| 1,642,755 | Ward | Sept. 20, 1927 |
| 1,719,290 | Danielson | July 2, 1929 |
| 1,737,619 | Smith | Dec. 3, 1929 |
| 2,139,541 | Farnsworth | Dec. 6, 1938 |
| 2,158,044 | Haller | May 9, 1939 |